United States Patent [19]
Davis et al.

[11] Patent Number: 5,683,102
[45] Date of Patent: Nov. 4, 1997

[54] PORTED PASSENGER AIRBAG MODULE CAN

[75] Inventors: Terry R. Davis, Layton; Michael J. Ravenberg, Corinne, both of Utah

[73] Assignee: Morton International, Inc., Chicago, Ill.

[21] Appl. No.: 629,261

[22] Filed: Apr. 8, 1996

[51] Int. Cl.[6] .................. B60R 21/20; B60R 21/26
[52] U.S. Cl. ............. 280/732; 280/736; 280/739; 137/74; 220/89.4
[58] Field of Search .................. 280/736, 739, 280/742, 741, 738, 737, 740, 732, 728.2, 728.1; 137/72, 74; 220/89.4

[56] References Cited

U.S. PATENT DOCUMENTS

| | | |
|---|---|---|
| 1,973,182 | 9/1934 | Shaw ............................ 220/89.4 |
| 4,147,272 | 4/1979 | Stenner et al. ..................... 137/72 |
| 4,561,675 | 12/1985 | Adams et al. . |
| 4,817,828 | 4/1989 | Goetz .............................. 280/736 |
| 5,100,174 | 3/1992 | Jasken et al. . |
| 5,217,249 | 6/1993 | Kokeguchi .................... 280/728.1 |
| 5,269,336 | 12/1993 | Subramanian ..................... 137/74 |
| 5,299,828 | 4/1994 | Nakajima et al. ................ 280/741 |
| 5,332,256 | 7/1994 | Lauritzen et al. ............. 280/728.2 |
| 5,358,272 | 10/1994 | Kokeguchi ....................... 137/74 |
| 5,378,017 | 1/1995 | Lindsey et al. . |
| 5,427,030 | 6/1995 | Kidd et al. . |
| 5,524,925 | 6/1996 | Rose et al. ...................... 280/739 |

Primary Examiner—Brian L. Johnson
Assistant Examiner—Peter C. English
Attorney, Agent, or Firm—Lawrence I. Field; Gerald K. White

[57] ABSTRACT

The actuation of autoignition material in an airbag inflation device is facilitated by providing ports in the module can or housing of the airbag inflation device, and filling the ports with plugs of a fusible, low-melting material, so that when exposed to bonfire conditions, the plugs melt and the ports provide access to the autoignition material.

10 Claims, 1 Drawing Sheet

PORTED PASSENGER AIRBAG MODULE CAN

This invention relates to an improvement in the extruded aluminum cans which serve as module housings in passenger side airbag installations. More particularly it relates to a module can with means to avoid pressurization of the can during autoignition when the airbag module can is exposed to bonfire conditions.

BACKGROUND OF THE INVENTION OR CAN

Passenger airbag modules generally comprise a housing or can within which there are an inflator, an undeployed airbag cushion and means for actuating the inflator at the time of a collision. The airbag module housing can also includes an auto-ignition package e.g. as described in the following recently issued U.S. Patents, the disclosures of which are incorporated by this reference:

| Adams et al   | 4,561,675 | December 31, 1985 |
| Jasken et al  | 5,100,174 | March 31, 1992    |
| Lindsey et al | 5,378,017 | January 3, 1995   |
| Kidd et al    | 5,427,030 | June 27, 1995     |

In the unlikely event that a fire occurs at the storage facility or a bonfire results from an automotive vehicle being involved in a collision, it is undesirable for excessive pressures to build up inside the module housing.

The purpose of the autoignition component as described in the Adams et al patent is to provide a mechanism for igniting the inflator contents at temperatures well below those at which the inflator charge reacts to generate large volumes of gas, and thereby moderates the pressures which build up in the module housing can. The several components are assembled and then stored until they are shipped to a location where they are installed in a vehicle.

OBJECTS OF THE INVENTION

One object of the invention is to provide an extruded module can or housing for an airbag in which the housing includes means to relieve pressure developed in said housing when it's contents are ignited.

Another object of the invention is to provide an airbag module can constructed with ports which provide enhanced access to the contents of said can when the module housing can is exposed to bonfire conditions.

Still another object of the invention is to provide a ported airbag module can or housing in which the ports are temporarily sealed with plugs which melt when the ports are exposed to bonfire temperatures.

A further object of the invention is to provide an airbag module can construction which is applicable to passenger side airbag modules and to driver side airbag modules.

These and other objects of the invention are achieved by an airbag module can provided with ports in the can housing and meltable plugs inserted in said ports.

SUMMARY OF THE INVENTION

In the present invention pressure build up due to autoignition is avoided by the provision of holes drilled or punched in the extruded module can, the holes being sealed with plugs which block the passage of inflation gases. The plugs are composed of materials intended to melt from the outside during bonfire conditions. During bonfire conditions the plugs melt away creating ports for direct flame and heat impingement on the inflator in the module can. This decreases the time to autoignition of the autoignition package in the housing. The ports relieve the pressures generating within the module can as a result of said autoignition.

BRIEF DESCRIPTION OF THE DRAWINGS

The invention will become clear and will be better understood from the description which follows taken in conjunction with the drawings in which.

DESCRIPTION OF THE PREFERRED EMBODIMENT

Figure 1:
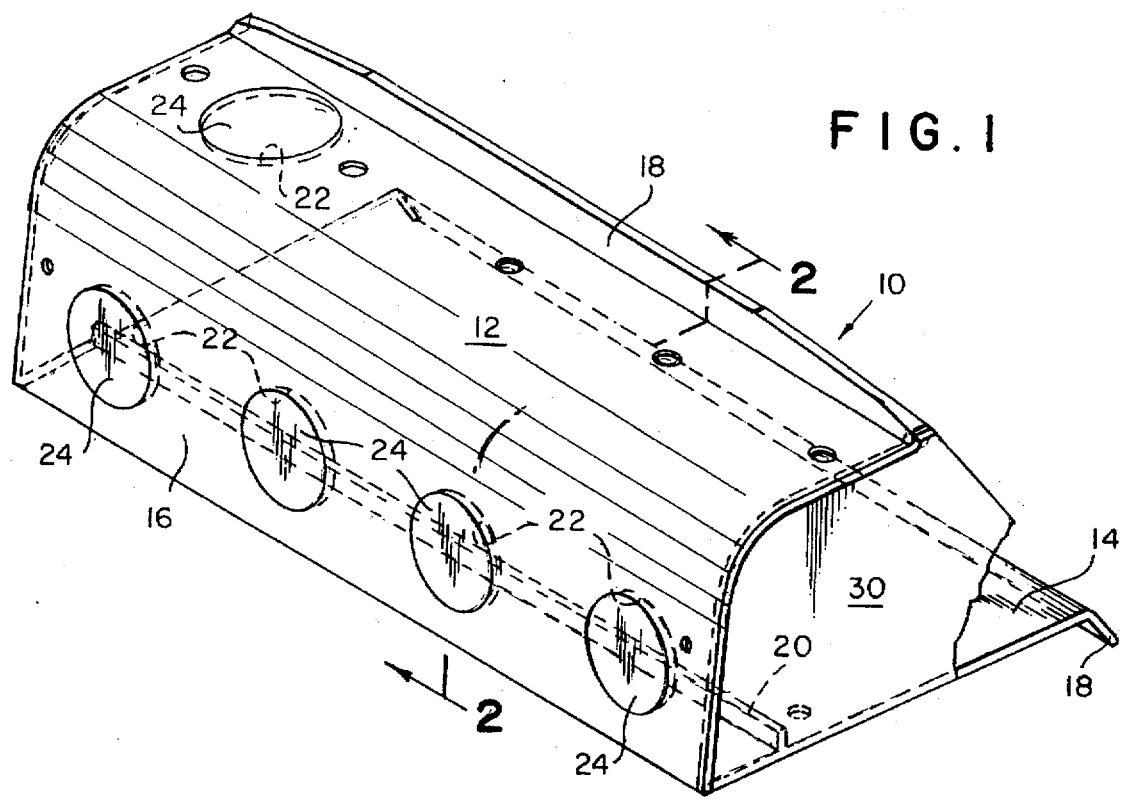
FIG. 1 is a view in perspective of a passenger side module can and FIG. 2 is a section on plane 2—2 through a port, in FIG. 1.
Figure 2:
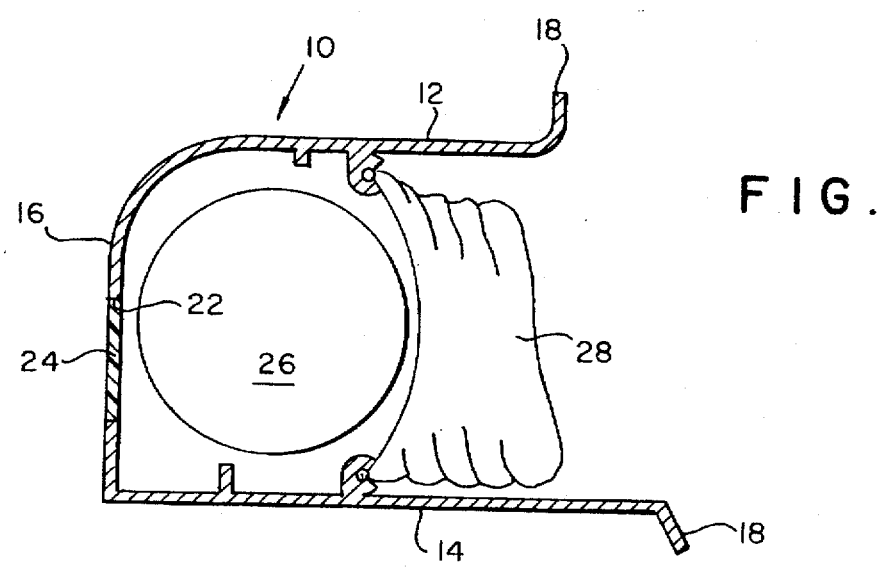

As shown in FIG. 1 a module can 10 has a generally U shaped configuration. Preferably the module can is an extrusion of an aluminum alloy as is known in this art. The module can has wails 12 and 14 which extend upwardly from a web 16. Depending on the orientation of the module, can walls 12 and 14 may be either top and bottom walls or side walls and web 16 may either be a side or the bottom of the module. The walls 12 and 14 terminate at their free ends with flanges 18 for mounting the can in an automotive vehicle in the usual way. The extrusion may include ribs 20 to reinforce the can and provide additional stiffness and strength to the module can. Holes 22 are punched or drilled in either web 16 or in a wail 12 or 14, each hole being dimensioned to receive a fusible plug 24. Holes of about one inch in diameter have been found suitable in a passenger side airbag module can approximately 10–12 inches long. An inflator 26 and air bag cushion 28 are installed in the module housing 10 in the usual way.

Plugs 24 are inserted in the holes 22 punched in the can. The plugs are designed to withstand the heat and pressure incidental to a normal inflation when the airbag cushion is deployed in the usual way. Plugs 24 are composed of material which remain solid at the temperatures to which the module is exposed when stored either in a warehouse or in an automotive vehicle—e.g. temperatures up to about 120° F. and even the more elevated temperatures to which they may be subjected when an airbag inflator is actuated and airbag cushion 28 is inflated. The plugs may be a low melting metal alloy such as Wood's metal or an organic material such as a wax designed to melt at 350° K. or above.

Since the purpose of the ports is to facilitate actuation of the autoignition material when the airbag inflation device is exposed to bonfire conditions, the ports are preferably located adjacent to the autoignition material in the inflator 26 and may even be in the end caps 30 of the module housing if an autoignition package is at one end of the inflation device.

In the event that the module can is exposed to bonfire conditions, the plugs will be exposed to temperatures well above the melting point of the plugs and once the plugs melt and the autoignition package in the inflator autoignites, the resulting gas evolution is vented through ports 22 avoiding a pressure build up in the module.

It will be seen that the ports formed when plugs 24 melt, enhance the performance of an extruded reaction can during bonfire conditions in several ways. First they allow direct impingement of heat and flames on the inflator cartridge, which decreases the time to autoignition of the inflator and module exposure time is also decreased so that wall strength of the module at ignition is higher. Second the ports act as vents during autoignition inflation, thereby decreasing the load on the module walls.

Although the invention has been described and shown in a passenger side airbag module can, it will be understood that it could also be applied to a driver side airbag module housing.

Having now described a preferred embodiment of the invention it is not intended that it be limited except as required by the appended claims.

We claim:

1. An airbag inflation device which includes an airbag and means to inflate said airbag and a housing for said airbag and said inflation means, wherein said inflation means includes an auto ignition material which ignites when said inflation means is exposed to bonfire temperatures, the improvement comprising at least one port in said housing and a fusible plug in each said port, each said fusible plug having a diameter substantially in excess of the thickness of said plug.

2. The device of claim 1 in which said fusible plug is made of a material which melts at bonfire temperatures.

3. The device of claim 2 in which said fusible plug material is a low melting metal alloy.

4. The device of claim 2 in which said fusible plug material is an organic material.

5. The device of claim 1 in which said housing is a generally U shaped extrusion.

6. The device of claim 5 in which said extrusion includes two walls joined by a web.

7. The device of claim 6 in which each said port is in said web.

8. The device of claim 6 in which each said port is in one of said walls.

9. The device of claim 1 in which said device is a passenger side airbag inflation device.

10. The device of claim 1 in which each said port is located adjacent to said autoignition material.

* * * * *